United States Patent
Broadbent

(10) Patent No.: US 9,429,641 B2
(45) Date of Patent: Aug. 30, 2016

(54) LOCATION SERVICES

(75) Inventor: Neil Broadbent, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 747 days.

(21) Appl. No.: 12/677,946

(22) PCT Filed: Sep. 9, 2008

(86) PCT No.: PCT/GB2008/003061
§ 371 (c)(1),
(2), (4) Date: Mar. 12, 2010

(87) PCT Pub. No.: WO2009/034314
PCT Pub. Date: Mar. 19, 2009

(65) Prior Publication Data
US 2010/0321181 A1  Dec. 23, 2010

(30) Foreign Application Priority Data
Sep. 12, 2007  (GB) .................................. 0717787.6

(51) Int. Cl.
*G08B 1/08* (2006.01)
*G01S 5/02* (2010.01)
*G06Q 30/02* (2012.01)

(52) U.S. Cl.
CPC ................. *G01S 5/02* (2013.01); *G06Q 30/02* (2013.01)

(58) Field of Classification Search
USPC ............ 340/539.13, 539.14, 539.15, 539.16, 340/539.17, 539.18, 539.19, 539.2, 573.3, 340/573.4
See application file for complete search history.

(56) References Cited

U.S. PATENT DOCUMENTS

| 5,870,523 | A | * | 2/1999 | Kikuchi et al. ................ 386/241 |
| 5,902,115 | A | * | 5/1999 | Katayama .................. 434/307 A |
| 6,278,938 | B1 | | 8/2001 | Alumbaugh |
| 6,321,158 | B1 | * | 11/2001 | DeLorme et al. ............ 701/426 |
| 6,456,936 | B1 | | 9/2002 | Neukirchen et al. |
| 6,539,393 | B1 | | 3/2003 | Kabala |
| 6,879,838 | B2 | | 4/2005 | Rankin et al. |
| 6,993,350 | B2 | * | 1/2006 | Katoh ........................... 455/457 |
| 7,085,818 | B2 | | 8/2006 | Brown |

(Continued)

FOREIGN PATENT DOCUMENTS

| CN | 1171579 A | 1/1998 |
| DE | 19852912 | 5/2000 |

(Continued)

OTHER PUBLICATIONS

International Search Report and Written Opinion of the International Searching Authority mailed Jan. 21, 2009 for corresponding PCT Application No. PCT/GB2008/003061 filed Sep. 9, 2008, 7 pages.

(Continued)

*Primary Examiner* — Travis Hunnings
(74) *Attorney, Agent, or Firm* — Squire Patton Boggs (US) LLP

(57) ABSTRACT

A portable device arranged to repeatedly determine its position, determine when it has been in the same location for a predetermined length of time on the basis of the periodically determined positions and, when it determines that it has been in the same location for the predetermined length of time, keep a record of that location. The device being further arranged to perform said determining and recording continuously and independently of a user.

20 Claims, 4 Drawing Sheets

(56) References Cited

U.S. PATENT DOCUMENTS

| | | | |
|---|---|---|---|
| 7,138,916 B2* | 11/2006 | Schwartz et al. | 340/572.1 |
| 7,158,882 B2 | 1/2007 | Abraham et al. | |
| 7,181,212 B2* | 2/2007 | Hogan et al. | 455/434 |
| 7,194,186 B1* | 3/2007 | Strub et al. | 386/241 |
| 7,256,711 B2* | 8/2007 | Sheha et al. | 340/995.1 |
| 7,310,534 B2 | 12/2007 | Northcutt | |
| 7,468,659 B2* | 12/2008 | Haave et al. | 340/539.13 |
| 7,940,172 B2* | 5/2011 | Bell et al. | 340/539.13 |
| 7,957,721 B2* | 6/2011 | Hogan et al. | 455/411 |
| 7,962,280 B2* | 6/2011 | Kindo et al. | 701/439 |
| 7,962,286 B2* | 6/2011 | Yoshida | 701/423 |
| 8,004,403 B2* | 8/2011 | McKethan | 340/539.23 |
| 8,086,402 B2* | 12/2011 | Kindo et al. | 701/465 |
| 8,103,447 B2* | 1/2012 | Kindo et al. | 701/439 |
| 8,111,157 B2* | 2/2012 | Diener et al. | 340/545.6 |
| 8,169,343 B2* | 5/2012 | Sheha et al. | 340/995.13 |
| 8,183,996 B2* | 5/2012 | Toyokawa et al. | 340/539.11 |
| 2002/0059178 A1* | 5/2002 | Hirabayashi et al. | 707/1 |
| 2003/0008670 A1* | 1/2003 | Katoh | 455/456 |
| 2003/0040314 A1* | 2/2003 | Hogan et al. | 455/435 |
| 2003/0061303 A1 | 3/2003 | Brown et al. | |
| 2003/0182052 A1* | 9/2003 | DeLorme et al. | 701/201 |
| 2004/0239508 A1* | 12/2004 | Kaneko | 340/573.4 |
| 2005/0234774 A1 | 10/2005 | Dupree | |
| 2006/0286987 A1 | 12/2006 | Ryu et al. | |
| 2008/0236514 A1* | 10/2008 | Johnson et al. | 119/719 |
| 2009/0271105 A1* | 10/2009 | Kindo et al. | 701/201 |
| 2010/0165960 A1* | 7/2010 | Richardson | 370/338 |
| 2011/0196604 A1* | 8/2011 | Kindo et al. | 701/200 |
| 2012/0001753 A1* | 1/2012 | Battista | 340/539.13 |
| 2012/0129497 A1* | 5/2012 | De Benedittis et al. | 455/411 |

FOREIGN PATENT DOCUMENTS

| | | | | |
|---|---|---|---|---|
| EP | 1 706 982 B1 | | 4/2008 | |
| JP | 2002005674 A | * | 1/2002 | G01C 21/00 |
| WO | WO 2008/083742 A1 | | 7/2008 | |
| WO | WO 2009/094690 A1 | | 8/2009 | |

OTHER PUBLICATIONS

International Search Report of the UK Intellectual Property Office mailed Dec. 18, 2007 for Great Britain Application No. 0717787.6 filed Sep. 12, 2007, 3 pages.

Office Action received in corresponding Chinese Application No. 200880106806.1, dated Aug. 10, 2011, 17 pages.

Chinese Office Action dated May 30, 2012 in corresponding Application No. 200880106806.1 (with English translation thereof attached).

Moon-Hee Park et al., "Location-Based Recommendation System Using Bayesian User's Preference Model in Mobile Devices," Springer Link, Yonsei University, Ubiquitous Intelligence and Computing, http://link.springer.com/chapter/10.1007/978-3-540-73549-6_110; 2007, 5 pages.

* cited by examiner

LOCATION SERVICES

RELATED APPLICATION

This application was originally filed as PCT Application No. PCT/GB2008/003061 filed Sep. 8, 2008, which claims priority to GB Application No. 0717787.6 filed Sep. 12, 2007. The invention relates to a portable device that is capable of determining its position.

Some portable devices are equipped with means for determining their position. Examples include mobile phones, PDAs, cameras etc. Commonly, portable devices use some form of trilateration to determine their position. Typically this involves the portable device measuring the distance between itself and three or more points whose position is known. For example, a GPS receiver determines the distance between itself and three satellites by measuring the time difference between transmission and reception of GPS signals (which travel at known speed) transmitted by each of the three satellites.

If the user of a portable device equipped with means for determining its position wants to know his location, he can use the location services of the device to determine it. The user can record that position information for later use, e.g. by remembering that information, by writing it down or by recording it manually in the device. However, existing portable devices are of limited use if the user does not know the relevant position information for a particular location. For example, if the user is at a great pub or restaurant and forgets to determine his position and make a note of that position while he is there, he may not necessarily be able to locate the pub or restaurant at a later date. Also, even if the user does remember to determine the relevant position information, having to write that information down or store it in the device may not be convenient. If the user tries to memorise the position information, he may not remember it correctly.

Therefore, there is a need for an improved portable device for providing location-based services.

STATEMENT OF INVENTION

According to the present invention there is provided a portable device arranged to: repeatedly determine its position; determine when it has been in the same location for a predetermined length of time on the basis of the periodically determined positions; and, when it determines that it has been in the same location for the predetermined length of time: keep a record of that location; the device being arranged to perform said determining and recording continuously and independently of a user.

The device could be arranged to consider that two positions are at the same location if each of those positions is located within a predetermined distance of each other.

The device could also be arranged to, when successively determined positions are within a predetermined distance of each other, determine that it has been located at the same location for at least the length of time between the time instant at which the first of those positions was determined and time instant at which the latest of those positions was determined.

The device may be arranged to determine that it has been located at the same location for the predetermined length of time by determining its position at a first time instant and determining that each of the positions it determines during the predetermined length of time following that time instant is within a predetermined distance of the position at determined at the first time instant.

The device could determine a position corresponding to the location and record that position. The device may record the position information as location coordinates, or as a waypoint.

The device could comprise a memory for storing map data and a display for displaying a map representative of the stored map data, the device being arranged to, when it displays the map, display a visual representation of the recorded location. The device could display the visual representation of the recorded location at a position on the map that corresponds to the position associated with the recorded location.

The device could comprise a user interface for receiving a user input, and the device could be arranged to receive a user input associated with the location and to record that user input in association with the recorded location.

The device is preferably arranged to keep a record of locations that are not of interest, to determine if the location is a location that is not of interest and, if the location is a location that is not of interest, not to keep a record of that location.

According to a second aspect of the invention there is provided a method for a device to record its location, the method comprising the device: repeatedly determining its position; determining when it has been in the same location for a predetermined length of time on the basis of the its periodically determined position; and, when the device has been in the same location for the predetermined length of time: keeping a record of that location; wherein the steps of determining and keeping a record and performed continuously and independently of a user.

According to a third aspect of the invention there is provided a computer program for configuring a portable device to: repeatedly determine its position; determine when it has been in the same location for a predetermined length of time on the basis of its periodically determined position; and, when it determines that it has been in the same location for the predetermined length of time: keep a record of that location, the computer program being capable of configuring the device to perform said determining and recording continuously and independently of a user.

For a better understanding of the present invention, reference is made by way of example to the following drawings, in which.

A portable device may be arranged to determine its position periodically and to, on the basis of those periodically determined positions, determine when it has been in the same location for a predetermined length of time. The device is arranged to, in response to such a determination, keep a record of that location. Suitably the device is arranged to perform these functions continuously and independently of the user. The device therefore performs these functions without requiring a user input as a trigger for storing a particular location. This addresses the problem of a user forgetting to record his position when at a location he may wish to revisit at a later date because the device automatically records any location at which it is located (which will normally also be the location of the user) for more than a predetermined length of time. Therefore, there is no need for the user to remember to trigger the recording of a position or to make some record of that position, because the device automatically performs both of these functions on a continuous basis.

Figure 1:
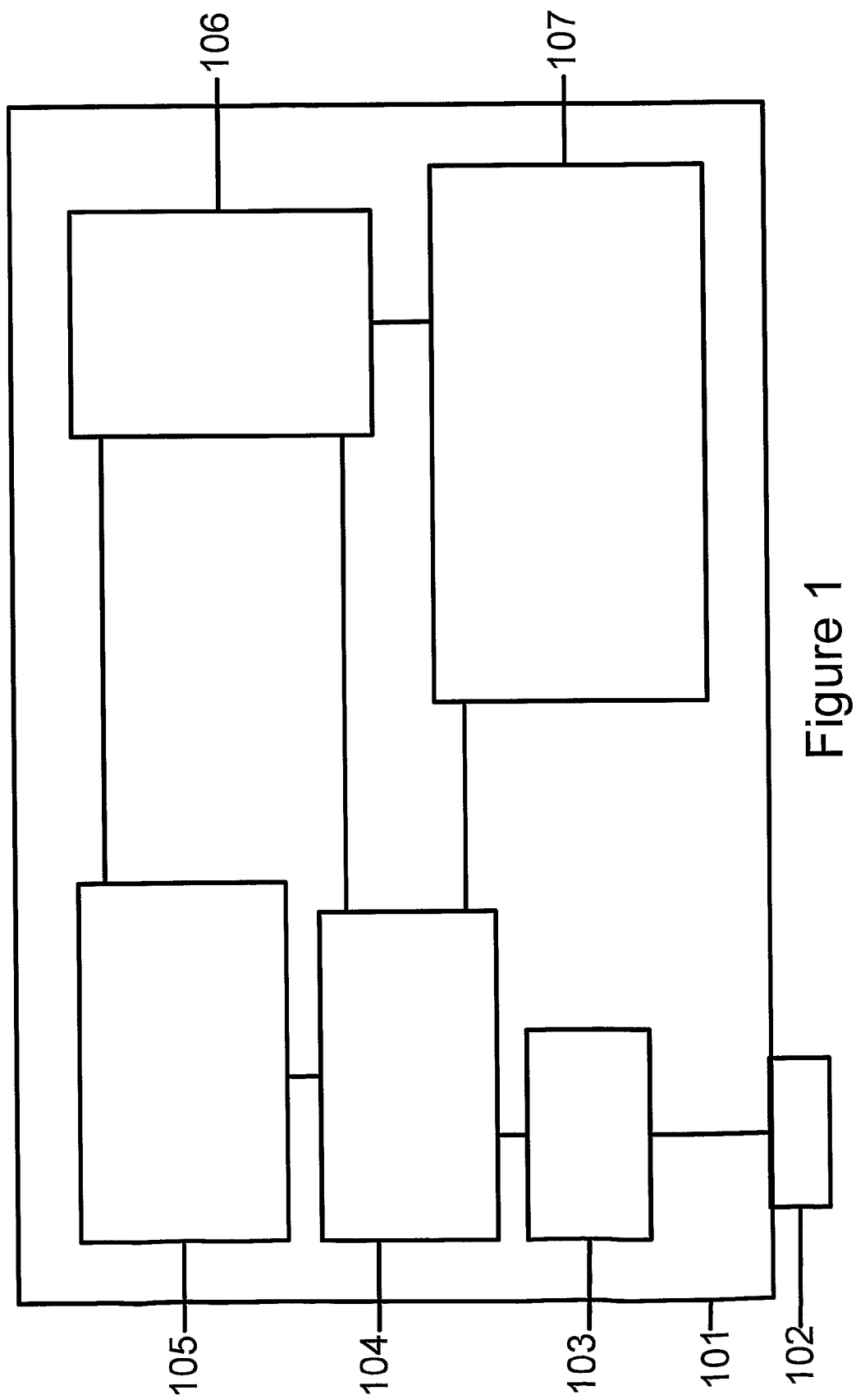
FIG. 1 shows a portable device for determining when it has been at the same location for a predetermined length of time.

FIG. 1 shows a portable device 101 that includes a location determination unit 103. In the device, the location determination unit is shown connected to an antenna 102. This will commonly be the case, since the majority of devices that are capable of determining their location do so by receiving signals from other devices. For example, a GPS device is arranged to determine its position by means of GPS signals received from satellites. The device may be arranged to determine its position solely using its location determination unit, or the device may perform some or all of the necessary processing in processor 104.

The portable device shown in FIG. 1 also includes a display 105, a user interface 106 and a memory 107.

The location determination unit is arranged to periodically determine the position of the device. For example, the location determination unit could determine the position of the device every few seconds. The time instant at which these determinations are made could be determined by the transitions of a clock contained in the location determination unit or elsewhere in the device.

The location determination unit may be arranged to determine when the device has been in the same location for a predetermined length of time. This predetermined length of time may be set by the user. A balance needs to be found between a time that is too short, so that too many locations that are not of interest to the user are recorded by the device, and a time that is too long, so that some locations that might be of interest are not recorded. A suitable time might be e.g. 20 minutes.

The location determination unit may be arranged to determine that it has been at the same location for the predetermined length of time if all of the position determinations it has made during that time lie within a predetermined distance of each other. For example, if the device measures its position to be a first set of coordinates and then for 20 minutes following the time instant at which the device made that measurement each measured position indicates a set of coordinates that is within 10 meters of the first set of coordinates, the device may assume that is has been at the same location for that 20 minute period. The predetermined distance may also be configurable by the user. Suitably the predetermined distance may be selected to be around the maximum distance the user might move within a location of interest (e.g. a night club, bar, restaurant, house or shop). For example, suitable values for the configurable distance may include 10, 15 or 20 meters.

If the device is not able to determine its position for some time, e.g. because it is in a building where reception is poor, it may keep a record of its last recorded position and check this against its current position when it is once again able to record that current position. For example, if the user enters a building in which reception is poor, the last recorded position of the device will be just outside the building. When the user exits the building, the next recorded position of the device will be outside the same building (i.e. at the same location as the previously recorded position). Therefore, the device may determine that for the period of time when it was unable to determine its position it was at the same location.

The location determination unit may determine that each of the positions it has measured for a predetermined length of time are within a predetermined distance of each other in several different ways. As one example, the location determination unit may store each measured position as it is determined. When a new measurement is made of the device's position, the device may compare the new measurement with the old stored measurement. If the new measurement is not within the predetermined distance of the old measurement, the location determination unit may replace the old measurement in memory with the new measurement. If the two measurements are within the predetermined distance of each other, the location determination unit may retain the old measurement in memory.

The location determination unit may start a timer or counter when it makes an initial measurement of the device's location. If the new measurement is within the predetermined distance of the original measurement, the location determination unit may increment the counter by one or allow the timer to keep running. The counter or timer may be reset if the new measurement is not within the predetermined distance of the old measurement. The location determination unit may determine that it has been at the same location for the predetermined length of time if either the timer is kept running for that predetermined length of time or the counter reaches a value equal to the number of position determinations that the location determination unit is arranged to make in the predetermined length of time.

If the location determination unit determines that the device has been in the same location for a predetermined length of time, it may cause a position corresponding to that location to be recorded in memory. The position may be any suitable position within the location. For example, the location determination unit may simply cause the first of the positions measured in that location to be recorded. Alternatively, the location determination unit may be arranged to store each of the positions measured during the period when it is determining whether it is at the same location, and to average these to form a position for recording in memory.

The location determination unit may enter a different mode of operation once it has determined that it has been at the same location for a predetermined length of time so as to avoid recording the same location multiple times in the event that the user is at the same location for a relatively long period of time. For example, the location determination unit may restart a counter or timer only once the measured positions indicate that the device has moved away from the previously recorded location.

The location determination unit may also be arranged to check previously recorded locations before recording a new location to avoid storing multiple entries for frequently visited locations. The location determination unit could be arranged to check each measured position against a database of recorded locations, and not to start a counter/timer or perform a comparison operation with a newly measured position if that position is within a predetermined distance of a position previously recorded as corresponding to a visited location.

Figure 2:
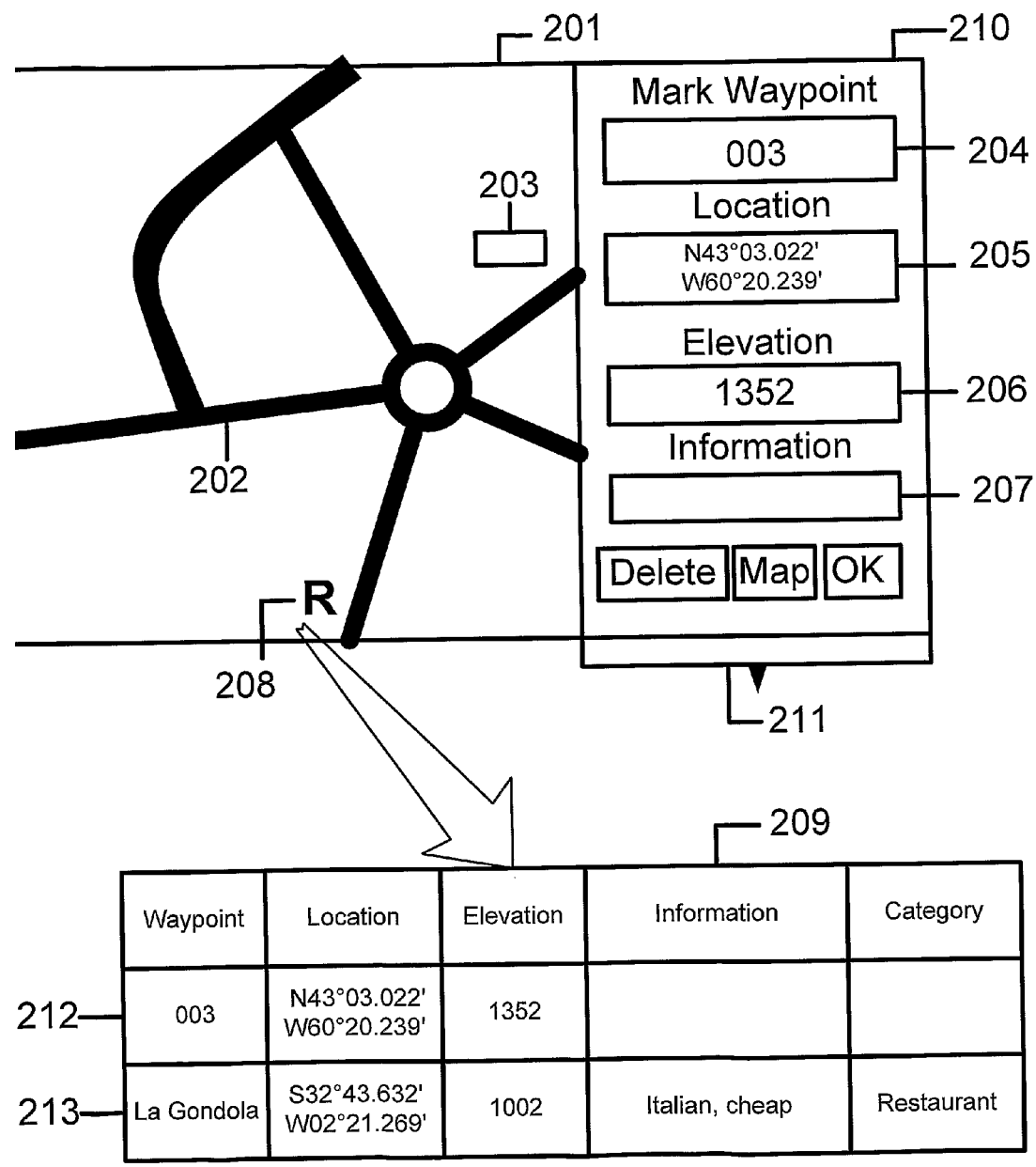
FIG. 2 shows position information recorded as map data.

The position data corresponding to a visited location may be stored as map data. An example is shown in FIG. 2. In this example, the portable device is arranged to display map data as a map image 201. The map data may be stored in the memory of the device to be accessed by the user when required. The position of the user (i.e. the position of the device) is marked on the map (202). The device may be arranged to display the map data so that the current position of the user is at the centre of the displayed map. The device is suitably provided with a user interface so that the user can scroll around the map shown on the screen and see areas of the map which are not displayed when the image is centred at the user's position.

The map data includes data representing roads and other map features. The map data may include waypoints that represent features of interest. In FIG. 2, one such waypoint is shown at 203. In the figure, the waypoint has been selected by the user, which has caused information box 210 to be displayed. The information box displays the name of the waypoint 204, the location 205 and elevation 206 of the waypoint and a section for any further information the user might want to add 207. The information box also offers the user a selection of functional options 211.

The device may be arranged to record the position information of a location at which it has been located for a predetermined length of time as a waypoint such as the waypoint 203 shown in FIG. 2. The recorded waypoint has been given a generic number as a name. The user may be able to change the name to something more memorable. The user may also be able to add additional information to the waypoint record to help him remember the location that the waypoint represents. The user may also be able to categorise the waypoint, e.g. as a restaurant, house, shop etc. The device may store an image or icon associated with each category of waypoint. The device may then display the appropriate image or icon at the position on the map where the waypoint is recorded. As an example, waypoint 208 represents a restaurant and so this waypoint is shown with an "R" icon on the map. The device may have an image or icon it associates with waypoints that it has recorded after determining that it has been in the same location for a predetermined length of time. This allows the user to easily identify waypoints that have been added to the map data by the device independently of the user. The user can then decide whether to change the name of the waypoint, add further information to the waypoint or simply delete the waypoint.

The device may store a database of waypoints, such as that shown at 209 in FIG. 2. The database includes entries for both of the waypoints visible in the display. The first entry 212 represents waypoint 203, which is a waypoint added by the device to which the user has not yet added additional information. The second entry 213 represents a waypoint that the user has adapted by changing its name, giving it a category and adding some additional information to the entry.

If the user decides to delete the record of a location that a device has made independently, the device may keep a record of the deleted location so that it knows in future that that location is not of interest to the user. The device may store a record of locations that are not of interest in a database. The information stored may include the position information determined for that location and originally stored as the location record. The device may determine that a measured position is at a location that is not of interest by determining whether the measured position is within a predetermined distance of a position recorded in association with a location that is not of interest. This predetermined distance may be the same as the threshold used for determining whether multiple positions are within the same location or different.

The device may be arranged not to keep a record of locations that are determined not to be of interest.

Figure 3:
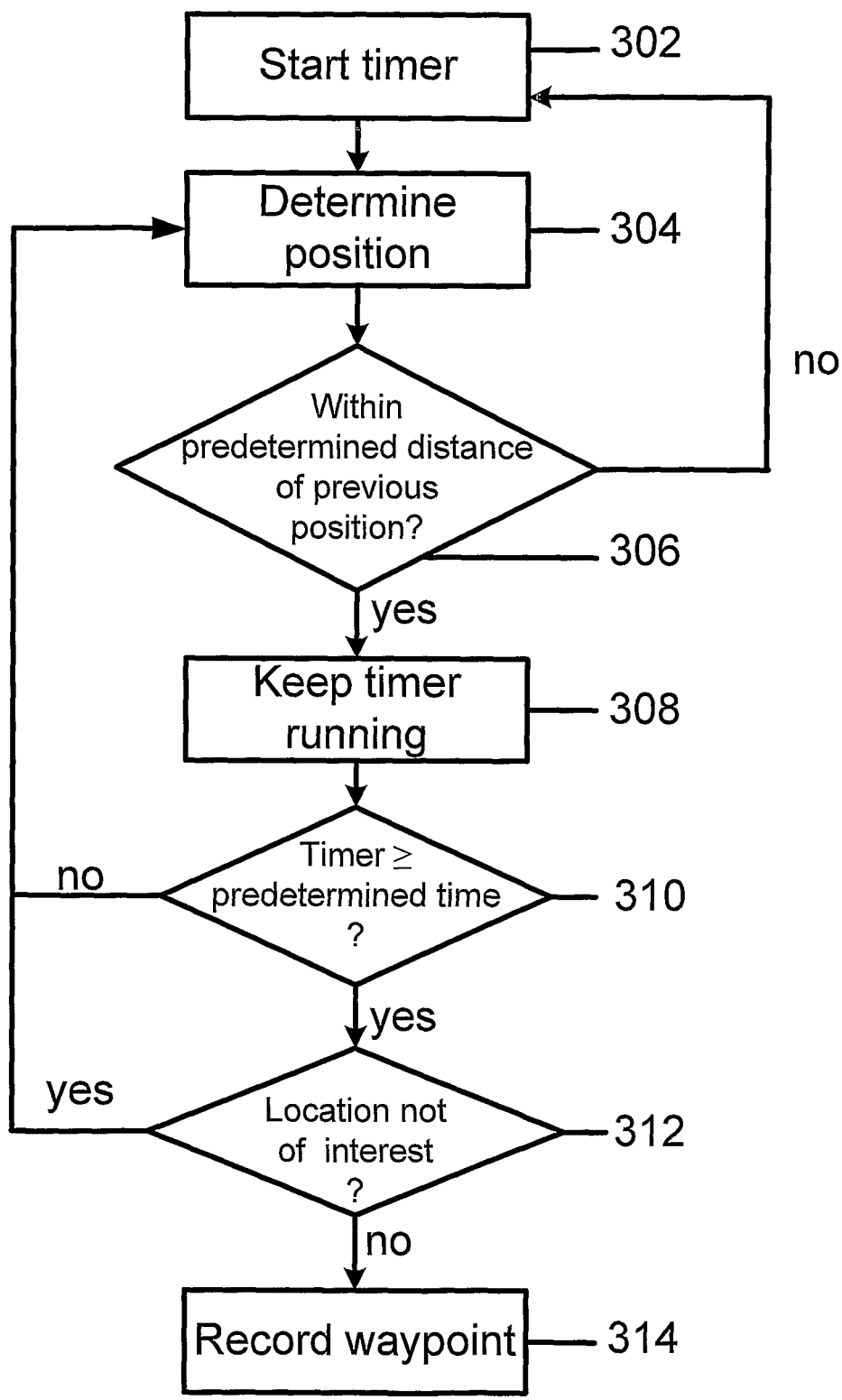
FIG. 3 shows the steps of a method for determining when a device has been at the same location for a predetermined length of time.

An example of a process that may be followed by a device independently creating a waypoint is shown in FIG. 3. In step 302 the device starts a timer and in step 304 the device determines its position. If the determined position is not within a predetermined distance of a previously determined position, the device repeats this process by returning to step 302. If the determined position is within a predetermined distance of a previously determined position, the device proceeds to step 308 by first keeping the timer running (308) and then by determining if the timer indicates that it has been at the same location for a predetermined length of time (310). If not, the device returns to step 304 and to determining its current position. If yes, the device checks if the location is a location that is not of interest (312). If the location is of interest, the device records a waypoint (314). If the location is not of interest, the device returns to step 304 and determines its current position.

Any device that is capable of determining its position may be used to implement the position recordal system described herein. The principles are the same for any type of location system that the device may use to determine its position, e.g. the device may use a Global Navigation Satellite System such as GPS or Gallileo or a cell-based positioning system such as those used in mobile phone networks. The device need not be capable of calculating or measuring its own position but instead could be arranged to determine its position by receiving this information from a third party device.

The device may be provided with specialised hardware for implementing the location recordal system described herein (e.g. by being provided with hardware to implement the location determination unit shown in FIG. 1). The device may be configured by software to implement the location recordal system (so that the location determination unit shown in FIG. 1 is e.g. implemented by means of a processor configured to implement the location recordal system by software). The device may also be provided with a combination of hardware and software for implementing the location recordal system.

The location recordal system may be implemented by means of a computer program, and suitably by an operating system of the portable device. The program may be in the form of source code, object code, a code intermediate source and object code such as code in partially compiled form, or in any other form suitable for use in the implementation of processes according to the invention. The computer program may be on or in a carrier. The carrier may be any entity or device capable of carrying the program.

The term 'portable device' includes, without being limited to, Laptop computers, Personal Digital Assistants (PDAs), Mobile Telephones, Smartphones, Digital Cameras and Digital Music Players. It also includes converged devices incorporating the functionality of one or more of the classes of device already mentioned, together with many other industrial and domestic electronic appliances.

Figure 4:
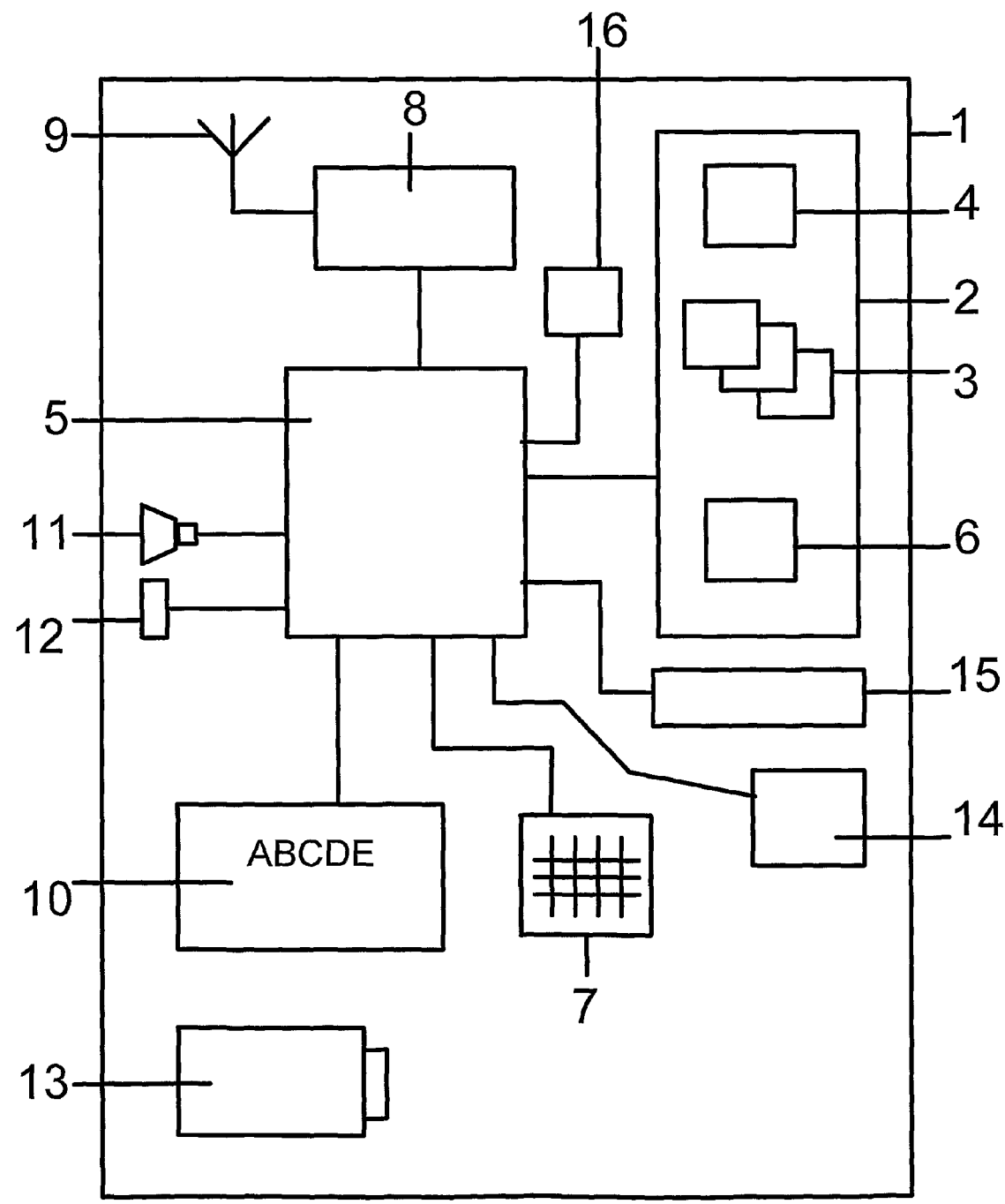
FIG. 4 shows a mobile telephone suitable for determining that it has been at the same location for a predetermined length of time.

FIG. 4 shows a mobile phone that may be arranged to independently determine when it has been at the same location for a predetermined length of time and record position information representative of that location. The mobile phone, shown generally at 1, includes a non-volatile memory 2 that stores instructions defining application programs (shown schematically at 3) and an operating system (shown schematically at 4). The mobile phone may be configured in such a way that the operating system controls the memory. The mobile phone has a CPU 5 which can execute the instructions stored in memory 2. The non-volatile memory also stores data (shown schematically at 6) defining a series of resource usage profiles. The mobile phone has a keypad 7 by which a user can control the operation of the phone. The mobile phone has an RF transceiver 8 coupled to an antenna 9, by means of which it can transmit and receive data according to a mobile phone radio protocol. The mobile phone may also be able to receive data that it uses to determine its location via the receiver, e.g. GPS data. The transceiver is coupled to the CPU. Data received by the transceiver is passed to the CPU and data can be passed from the CPU to the transceiver for transmission. The mobile phone has a display 10 for displaying data to a user (e.g. map data), a loudspeaker 11 for producing sound (e.g. to reproduce audio data received through the transceiver 8) and a microphone 12 for receiving sound (e.g. to capture audio data that is subsequently to be transmitted by the transceiver 7). The mobile phone is powered by a battery 13. The mobile phone may be provided with a working memory, which may be on the CPU or in RAM (random access memory) 15 coupled to the CPU. The mobile phone may also be provided with a ROM (read only memory) 16 coupled to the CPU.

The mobile phone may suitably be configured by its operating system to independently keep a record of locations at which it has been located for a predetermined length of time as described herein. The location determination unit shown in FIG. 1 may then be implemented by the CPU acting under software control.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A portable device comprising a memory and a processor, the portable device being configured to:
   repeatedly attempt to determine a position of the portable device independently of user requests, to provide a plurality of consecutive positioning attempt results;
   identify a determined location as a location of interest, based on whether the portable device has been in a same location for a predetermined length of time according to the plurality of consecutive positioning attempt results, wherein the predetermined length of time is greater than a length of time between consecutive positioning attempt results, wherein the location of interest is identified independently of user requests; and
   display, on a display, a visual representation of at least one identified location of interest.

2. A portable device as claimed in claim 1, wherein the device is arranged to consider that two positions are at the same location if each of those positions is located within a predetermined distance of each other.

3. A portable device as claimed in claim 1, wherein the device is arranged to, when successively determined positions are within a predetermined distance of each other, determine that it has been located at the same location for at least the length of time between the time instant at which the first of those positions was determined and time instant at which the latest of those positions was determined.

4. A portable device as claimed in claim 1, wherein the device is arranged to determine that it has been located at the same location for the predetermined length of time by determining its position at a first time instant and determining that each of the positions it determines during the predetermined length of time following that time instant is within a predetermined distance of the position at determined at the first time instant.

5. A portable device as claimed in claim 1, wherein the device is arranged to determine a position corresponding to the determined location and to record that position.

6. A portable device as claimed in claim 5, wherein the device is arranged to record the position information as location coordinates.

7. A portable device as claimed in claim 6, wherein the device is arranged to record the determined location as a waypoint.

8. A portable device as claimed in claim 6, wherein the device is arranged to display the visual representation of the recorded location at a position on the display that corresponds to the position associated with the recorded location.

9. A portable device as claimed in claim 1, wherein the device comprises a user interface for receiving a user input, the device being arranged to receive a user input associated with the determined location and to record that user input in association with the determined location.

10. A portable device as claimed in claim 1, wherein the device is arranged to keep a record of locations that are not of interest, to determine if the determined location is a location that is not of interest and, if the location is a location that is not of interest, not to keep a record of that location.

11. A portable device as claimed in claim 1, wherein the identification is performed only when it is determined that the portable device has been in the same location for the predetermined length of time.

12. A portable device as claimed in claim 1, wherein the identification is performed on a continuous basis.

13. A method for a device to record its location, the method comprising:
   repeatedly attempting to determine a position of the device;
   identifying a determined location as a location of interest, based on whether the device has been in the a location for a predetermined length of time according to the plurality of consecutive positioning attempt results, wherein the predetermined length of time is greater than a length of time between consecutive positioning attempt results, wherein the location of interest is identified independently of user requests; and
   displaying, on a display, a visual representation of at least one identified location of interest.

14. A method as claimed in claim 13, further comprising: recording position information of the location of interest as location coordinates.

15. A method as claimed in claim 13, further comprising: recording position information of the location of interest as a waypoint.

16. A method as claimed in claim 13, further comprising:
   receiving a user input associated with the determined location; and
   recording that user input in association with the recorded determined location.

17. A computer program embodied on a non-transitory computer readable medium having instructions embodied thereon, said instructions adapted to be executed for configuring a portable device to:
   repeatedly attempt to determine a position of the portable device independently of user requests, to provide a plurality of consecutive positioning attempt results;

identify a determined location as a location of interest, based on whether the portable device has been in a same location for a predetermined length of time according to the plurality of consecutive positioning attempt results, wherein the predetermined length of time is greater than a length of time between consecutive positioning attempt results, wherein the location of interest is identified independently of user requests; and display, on a display, a visual representation of at least one identified location of interest.

18. A computer program as claimed in claim 17, further comprising:

determining that the portable device is stationary with respect to a last determined position when an attempt to determine the position fails.

19. A computer program as claimed in claim 17, further comprising:

checking whether the determined location corresponds to a set of previously determined locations; and recording the determined location based on the determined location not corresponding to a previously determined location.

20. A computer program as claimed in claim 17, wherein determination of the position of the portable device is accomplished by receiving the position from another device.

* * * * *